April 15, 1952   N. FENGER   2,592,798
HYDRAULIC CONTROL VALVE
Filed Feb. 11, 1948   2 SHEETS—SHEET 1

INVENTOR.
Nicholas Fenger.
BY Bair & Freeman
Attys.

April 15, 1952 N. FENGER 2,592,798
HYDRAULIC CONTROL VALVE
Filed Feb. 11, 1948 2 SHEETS—SHEET 2
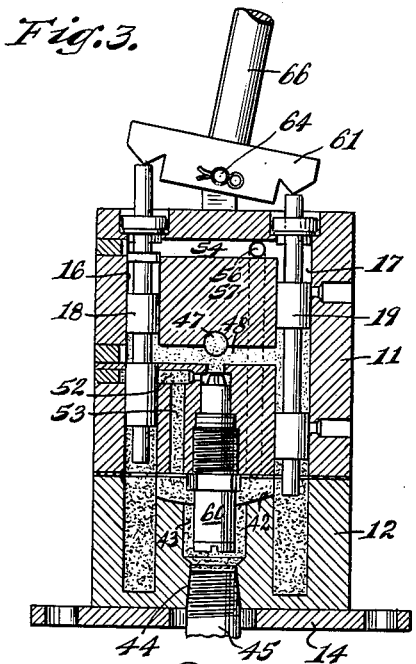
Fig.3.
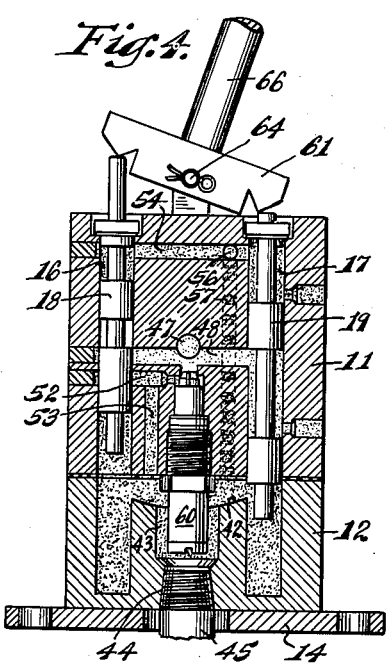
Fig.4.
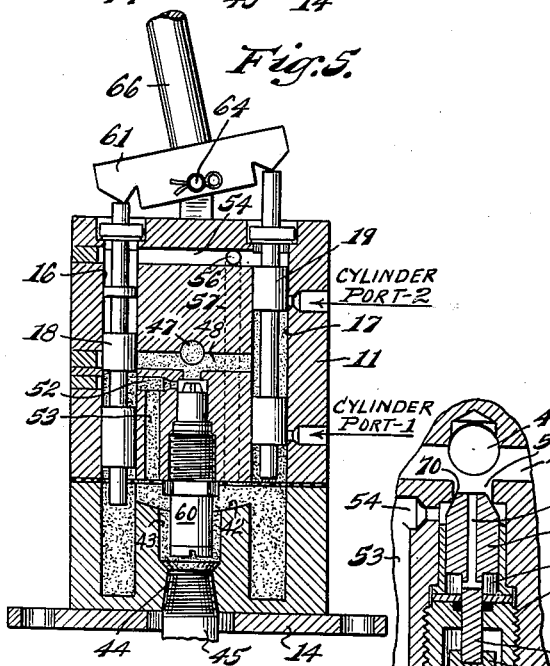
Fig.5.
Fig.7.
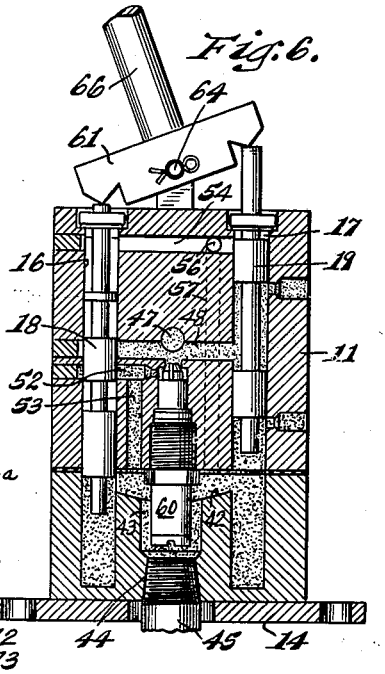
Fig.6.
INVENTOR.
Nicholas Fenger.
BY 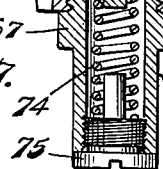
Att'ys.

Patented Apr. 15, 1952

2,592,798

UNITED STATES PATENT OFFICE 2,592,798

HYDRAULIC CONTROL VALVE

Nicholas Fenger, Bryan, Ohio, assignor to The Aro Equipment Corporation, Bryan, Ohio, a corporation of Ohio Application February 11, 1948, Serial No. 7,668

8 Claims. (Cl. 277—21)

This invention relates to a hydraulic control valve, and particularly to a hydraulic control valve for operating a two way cylinder, such as used, for example, on a hydraulic jack.

It is an important object of the invention to provide such a hydraulic valve in which long fluid seals are provided for a relatively small overall size of valve.

It is another object of the invention to provide a novel, readily machined hydraulic valve.

It is a further object of the invention to provide a two piston valve in which the pistons move in opposite directions to control fluid flow, and also to provide a novel arrangement of fluid passages.

It is an additional object of the invention to provide a hydraulic control valve which automatically returns to the neutral or "hold" position.

With these and other objects in view, the invention consists in the construction, arrangement and combination of the various parts of my device whereby the objects contemplated are attained, as hereinafter more fully set forth, pointed out in the claims and illustrated in the accompanying drawings, wherein:

Figure 3 is a diagrammatic view of the valve shown in one of its intermediate positions;

Figure 4 is a view of the valve shown in its position for delivering fluid under pressure to one cylinder port and receiving fluid from the other cylinder port;

Figure 5 is a view similar to Figure 3, showing the valve in its other intermediate position;

Figure 6 is a view similar to Figure 4, showing the valve delivering and receiving fluid from the opposite cylinder ports; and Figure 7 is a detail view of the pressure relief device and surrounding passages utilized in the valve.

Figure 2:
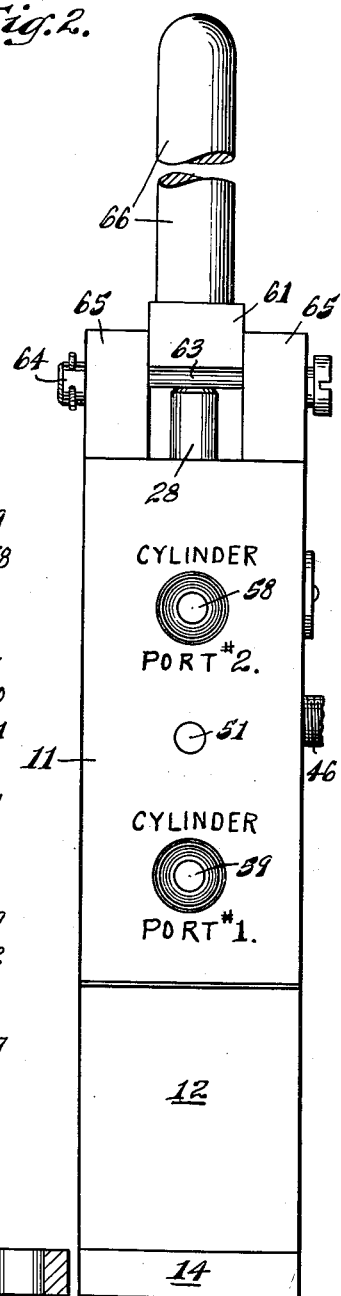
Figure 2 is an end elevational view of the valve.

Since the type of double acting cylinder controlled by the valve, as well as the pump and reservoir, are well known in the art, it is unnecessary to show or describe such devices, except to point out that the cylinders are provided with two cylinder ports, one of which receives fluid under pressure, while the other is a relief port, and vice versa. For convenience, the connections for the two cylinders have been shown on the valve body in Figure 2, and will be referred to as to or from cylinder port #1 or cylinder port #2.

Referring specifically to the drawings for a detailed description of the invention, numeral 11 designates generally a main body portion of the valve, and numeral 12 a base portion of the valve, which is secured to the main body portion by bolts 13. A mounting plate 14 is secured to the base 12 by means of bolts 15.

Longitudinal passages 16 and 17 are bored completely through the main valve body 11 and partially through the base 12. Disposed in the longitudinal bores 16 and 17 are pistons or spools generally indicated by the numerals 18 and 19. Suitable packings 20 are provided at the top of the valve body for the spools 18 and 19.

The spools are dissimilar in construction, the spool 18 including a reduced portion 21 extending upwardly through the packing, and enlarged portions 22, 24 and 26. A reduced portion 23 is provided between the enlarged portions 22 and 24. A reduced portion 25 is disposed between the enlarged portions 24 and 26. A reduced guide portion 27 is provided at the bottom of the spool 18.

The spool 19 has a reduced portion 28 extending through the packing 20 and has enlarged portions 29 and 31 with a reduced portion 30 therebetween. A reduced guide extension 32 is provided on the bottom of the spool 19.

A spring 34 is disposed in the lower portion of the longitudinal passage 16, and one end thereof abuts against the bottom of the passage shown at 35, and the other end thereof abuts against a shoulder 36 formed by the enlarged portion 26 of spool 18. Likewise, a spring 37 is disposed in the bottom 38 of the passage 17, and one end of the spring abuts against the bottom 38 of the passage 17, the other end abutting against a shoulder 39 formed by the enlarged portion 31 of the spool 19. It is, therefore, apparent that both the spools 18 and 19 are normally urged in an upward direction by the springs 34 and 37, respectively.

The base member 12 is also provided with a hollowed portion 41 adjacent the top thereof, between the bores 16 and 17, to provide with the main body portion of the valve a chamber 42. The base 12 is also bored centrally thereof to provide an opening or chamber 43 which terminates at its lower end in a threaded portion 44, which is in communication with an outlet pipe 45 for the fluid passing through the valve.

The inlet pipe for fluid entering the valve from a suitable pump (not shown) is numbered 46 and communicates with a horizontal inlet bore 47 in the valve body 11.

The main valve body 11 is provided with a horizontal chamber or passage 48, which extends completely through the valve body and which communicates with the inlet passage 47. Suitable plugs 49 and 51 seal the ends of the passage 48. A short longitudinal passage 52 is provided and communicates with the longitudinal passage 16 at a point below the passage 48. A chamber or passage 53 is bored longitudinally of the valve body and extends between the short horizontal passage 52 and the space 42.

A horizontal passage or chamber 54 is provided adjacent the upper portion of the main valve body 11, but only extends through one side thereof to the opposite horizontal passage 17. A suitable plug 55 closes the other end of the horizontal passage 54.

A short horizontal passage 56 is provided at right angles to the passage 54, and a longitudinal passage 57 extends between the passage 56 and the chamber 42.

Communication between the longitudinal passage 17 and cylinder port #2 is provided by a threaded port opening 58 in the body 11. Likewise, communication with cylinder port #1 with longitudinal passage 17 is provided by a threaded port opening 59.

Disposed at the top of the valve body is a piston or spool operating member 61, having knife edge projections 62 and 63 formed thereon, which projections engage with the flat ends of spool extensions 21 and 28, respectively. The spool operating member 61 is pivoted on a rod 64, which extends between, and is supported by, ears or lugs 65 secured to the top of the valve body 11. An operating handle 66 threadably engages with the operating member 61, so that the person operating the device may grasp the handle and move it either to the left or to the right, as viewed in Figure 1.

A relief valve mechanism, generally indicated by the numeral 60, is secured to the main valve body 11 and comprises a main body portion 67, which is secured in a bore 50 provided in the main valve body. The bore 50 would extend between the horizontal passage 48 and the chamber 42, if the relief valve 60 were not present. Cooperating threads 68 are provided in the bore 50 and on the member 67 to retain the relief valve in position.

The relief valve 60 is also provided with a plunger or piston 69 having a seat 70 which cooperates with a shoulder on the main valve body 11 formed in the passage 50. The piston 69 is provided with a guide stem 72, which is secured to a member 73, and which provides an upward abutment for an adjusting spring 74. The lower end of the spring 74 abuts against an adjusting screw 75, which is threaded into the member 67. An annulus 71 is provided for guiding the piston 69, and this annulus is approximately 95% of the area of the exposed portion of the piston 69, so that a modified balanced type valve is provided which requires only a slight change in pressure to move it in either direction. The valve, obviously, may be loaded to any desired value by adjusting the spring 74. It is obvious when the piston 69 is forced downwardly by fluid pressure that communication is afforded between the horizontal passage 48 and the passages 53 and 54 in the main valve body.

*Operation*

Referring now to Figures 1 and 3 to 6, inclusive, the operation of the valve will be described. When the valve is in the neutral position shown in Figure 1, with neither of the spools 18 and 19 depressed, the hydraulic fluid, usually oil, is pumped directly from the pump to a reservoir (not shown). The oil enters through pipe 46 and inlet passage 47. It then passes through horizontal passage 48, past the reduced portion 25 of spool 18, through passages 52 and 53 to chamber 42, and thence through passages 43 and 44 to pipe 45.

As the handle is pushed to the right, as shown in Figure 3, the oil which is being pumped is prevented from flowing to the reservoir, because the enlarged portion 26 of the spool 18 blocks passage 52. At this time, the pumped oil cannot escape, so it forces the relief valve 60 open and oil is returned to the reservoir through passages 50, 52 and 53 to chamber 42 and then through passages 43 and 44 to pipe 45.

As the handle 66 is pushed completely to the right, the oil under pressure is fed to the outlet 59, which communicates with cylinder port #1. The oil again enters pipe 46, passes through inlet passage 47 and into passage 48. Since spool 19 is depressed to its maximum, the reduced portion 30 thereof is opposite the outlet 59, and high pressure oil will flow from passage 48 through longitudinal passage 17, and through outlet 59 to cylinder port #1. At the same time, oil is exhausted from cylinder port #2 and flows to the reservoir, passing through the threaded opening 58, past reduced portion 28 of spool 19, and into horizontal passage 54. Oil then passes through the passages 56 and 57 to the chamber 42, and thence through passages 43 and 44 to pipe 45.

Figure 1:
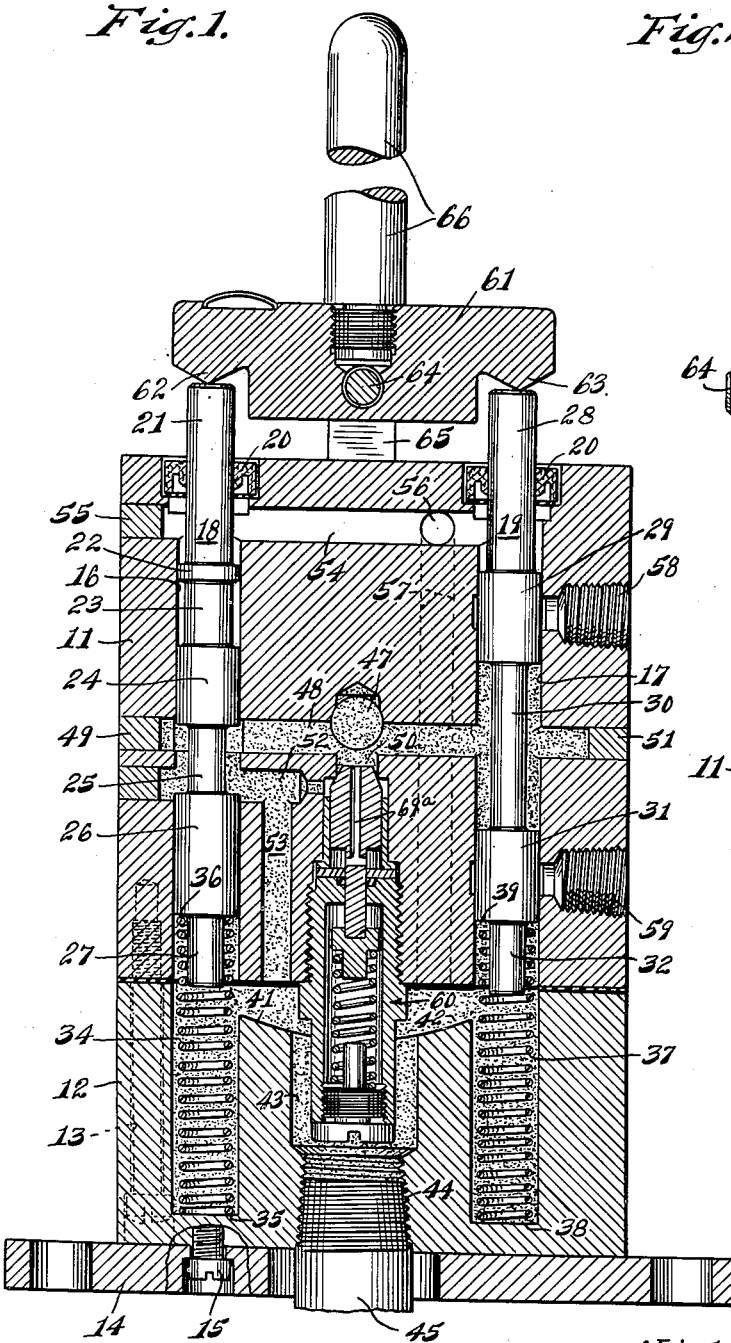
Figure 1 is a full size vertical sectional view of the valve.

When the handle 66 is released, the valve will return to the neutral position, shown in Figure 1, allowing the pumped oil to again flow to the reservoir, and sealing the pressurized oil on the side of the cylinder connected to the passage 59 and cylinder port #1.

When the handle 66 is pushed to the left, as shown in Figure 5, the pumped oil is prevented from flowing to the reservoir, and again is forced through the relief valve 60. The oil again enters the pipe 46 and inlet 47, and is forced into passage 48. However, oil cannot escape from the passage 48, because the enlarged portions 29 and 31 block the cylinder connections 58 and 59, and the enlarged portion 24 of spool 18 blocks passage 48. The oil, therefore, is pumped past the relief valve through passages 50, 52 and 53 to chamber 42 and thence through passages 43 and 44 to pipe 45.

As the handle is pushed completely to the left, the pressurized oil is fed to cylinder port #2 through the port opening 58, and simultaneously oil from the opposite side of the cylinder is free to flow to the reservoir. The oil from the pump passes through pipe 46 and inlet 47 to passage 48. Enlarged portion 24 of spool 18 still blocks one end of the passage 48. Enlarged portion 31 of spool 19 blocks the port opening 59. However, enlarged portion 29 of spool 19 is now above the port opening 58, and pressurized oil may flow from passage 48 through longitudinal passage 17 and through port opening 58 to cylinder port #2. At the same time, oil is exhausted through cylinder port #1 and opening 59, and passes through the lower portion of longitudinal passage 17 into the chamber 42, and then to the passages 43 and 44 to pipe 45. The low pressure oil also enters passages 52 and 53, but these are blocked by the enlargement 24 on spool 18.

When the handle 66 is again released, it will return to the neutral position shown in Figure 1, thus sealing the pressurized oil on the side of the cylinder connected to the port #2.

The hole or passage 56, in addition to permitting the oil from the cylinder to flow into the reservoir when in the position shown in Figure 4, also enables any leakage of the seals on the spools to flow toward the reservoir. This prevents any high pressure build-up against the seals, and eliminates or minimizes any leakage through the packings 20.

It will be noted from Figures 4 and 6 that there are four enlargements on the plungers 18 and 19 which block the flow of high pressure hydraulic fluid from passing to the outlet passage 45 when said high pressure fluid is being directed to one or the other of said cylinder ports. Five such blocks are provided when the valve is in the neutral position shown in Figure 1.

From the foregoing it will be apparent that I have provided an improved hydraulic control valve which has exceptionally long seals in a relatively small valve.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. Valve means for controlling the flow of hydraulic fluid comprising a valve body having a pair of bores therein, a reciprocable valve plunger disposed in each of said bores, resilient means for urging both of said plungers in the same direction, mechanical means disposed exteriorly of the valve body for moving one of the plungers at a time against the bias of the resilient means and for affording movement of the other plunger in the opposite direction due to the force exerted by said resilient means at the same time, an inlet passage for hydraulic fluid in said valve body, an outlet passage for hydraulic fluid from said valve body, a pair of cylinder ports in said valve body communicating with a first bore of said pair of bores, a chamber in said valve body communicating with said outlet passage and a portion of both of said bores, a second chamber in said valve body communicating with another portion of both of said bores and said inlet passage, a third chamber in said valve body communicating with both of said bores, a relief passage between said third and first chambers, said plunger in the first bore being effective to direct fluid from said inlet passage and said second chamber to one or the other of said cylinder ports and to direct fluid from the other of said cylinder ports to said outlet passage when said last plunger is in one position, and to reverse the flow through said cylinder ports when in another position, said relief passage directing said hydraulic fluid from one of said cylinder ports to said outlet passage when the said last plunger is in one of said positions, both said plungers being adapted to be positioned in a third neutral position, a fourth chamber in said valve body communicating with the second of said bores, said second chamber and said first chamber when the second plunger is in said neutral position, the first said plunger being then effective to prevent any flow of hydraulic fluid through said cylinder ports, and the second said plunger then being effective to direct hydraulic fluid from said inlet passage and through said second chamber, said second bore, said fourth chamber and said first chamber to said outlet.

2. Valve means for controlling the flow of hydraulic fluid comprising a valve body having a pair of bores therein, a reciprocable valve plunger disposed in each of said bores, resilient means for urging both of said plungers in the same direction, mechanical means disposed exteriorly of the valve body for moving one of the plungers at a time against the bias of the resilient means and for affording movement of the other plunger in the opposite direction due to the force exerted by said resilient means at the same time, an inlet passage for hydraulic fluid in said valve body, an outlet passage for hydraulic fluid from said valve body, a pair of cylinder ports in said valve body communicating with one of said bores, a chamber in said valve body communicating with said outlet passage and a portion of both of said bores, a second chamber in said valve body communicating with another portion of both of said bores and said inlet passage, a third chamber in said valve body communicating with both of said bores, and a relief passage between said third and first chambers, one of said plungers being effective to direct fluid from said inlet passage and said second chamber to one or the other of said cylinder ports and to direct fluid from the other of said cylinder ports to said outlet passage when said last plunger is in one position, and to reverse the flow through said cylinder ports when in a second position, both said plungers being adapted to be positioned in a third neutral position, and the other plunger cooperating to by-pass the flow of fluid from the inlet to the outlet when in said neutral position.

3. A valve for controlling the flow of hydraulic fluid comprising a valve body having a pair of bores therein, a reciprocable valve plunger disposed in each of said bores, said plungers each having a plurality of enlarged and reduced portions, said valve body forming three cross passageways, two connecting passageways one of which is a by-pass passageway, a supply port, two cylinder ports, and a return port, each of said three cross passageways joining the pair of bores to each other, each of a pair of said three cross passageways being separately ported by said connecting two passageways to the third cross passageway, said third cross passageway communicating with said return port, said supply port introducing the fluid to said valve body and communicating with one of the said pair of cross passageways, said two cylinder ports, one of which serves as an inlet and the other serves as an outlet and vice versa, communicating with one of said bores, said by-pass passageway communicating the supply port to the return port when the valve plungers are in the neutral position, and means for reciprocating said plungers so that the enlarged and reduced portions of one of said plungers cooperates with said cross passageways and said cylinder ports to form two continuous flow paths, one path from said supply port to one of said cylinder ports and the other path from the second cylinder port to the return port, and means for reversing the flow paths from the supply and return ports to the opposite cylinder ports.

4. A valve for controlling the flow of hydraulic fluid comprising a valve body having a pair of bores therein, a reciprocable valve plunger disposed in each of said bores, said plungers each having a plurality of enlarged and reduced portions, said valve body forming three cross passageways, two connecting passageways, a supply port, two cylinder ports, and a return port, each of said three cross passageways joining the pair of bores to each other, each of a pair of said three cross passageways being separately ported by said two connecting passageways to the third cross passageway, said third cross passageway communicating with said return port, said supply port introducing the fluid into said valve body and communicating with one of the said pair of cross passageways, said two cylinder ports, one of which serves as an inlet when the other serves as an outlet and vice versa, communicating with one of said bores, and means for reciprocating said plungers so that the enlarged and reduced portions of one of said plungers cooperates with said cross passageways and said cylinder ports to form two continuous flow paths, one path from said supply port to one of said cylinder ports and the other path from the second cylinder port to the return port, and means for changing the flow paths from the supply and return ports to the opposite cylinder ports.

5. A valve for controlling the flow of hydraulic fluid comprising a valve body having a pair of bores therein, a reciprocable valve plunger disposed in each of said bores, said plungers each having a plurality of enlarged and reduced portions, a pressure relief valve mounted in said valve body, said valve body forming three cross passageways, two connecting passageways one of which is a by-pass passageway, a supply port, two cylinder ports, and a return port, each of said three cross passageways joining the pair of bores to each other, each of a pair of said three cross passageways being separately ported by said two connecting passageways to the third cross passageway, said third cross passageway communicating with said return port, said supply port introducing the fluid to said valve body and communicating with one of the said pair of cross passageways, said two cylinder ports, one of which serves as an inlet and the other serves as an outlet and vice versa, communicating with one of said bores, said by-pass passageway communicating the supply port to the return port and by-passing the pressure relief valve when the valve plungers are in the neutral position, and means for reciprocating said plungers so that the enlarged and reduced portions of one of said plungers cooperates with said cross passageways and said cylinder ports to form two continuous flow paths, one path from said supply port to one of said cylinder ports and the other path from the second cylinder port to the return port, means for reversing the flow paths from the supply and return ports to the opposite cylinder ports, and means including said pressure relief valve for communicating the inlet port to the return port when said plungers are in any position between neutral and operating.

6. A valve for controlling the flow of hydraulic fluid comprising a valve body having a bore therein, a reciprocable valve plunger disposed in said bore, a pressure relief valve mounted in said valve body, said plunger having a plurality of enlarged and reduced portions, said valve body forming a plurality of cross passageways, a plurality of connecting passageways including a by-pass passageway, a supply port, two cylinder ports, and a return port, one of said connecting passageways being controlled by said pressure relief valve, said supply port communicating by means of one of the cross passageways to both the bore and to the connecting passageway controlled by the pressure relief valve, said cross passageways and connecting passageways being in communication with each other so as to form a plurality of continuous paths communicating the bore to the return port, the by-pass passageway communicating the supply port to the return port and by-passing the pressure relief valve when the valve plunger is in the neutral position, a valve member, simultaneously reciprocable in a direction opposite to the direction of movement of the valve plunger, for closing the by-pass passageway upon moving the valve plunger in either direction out of neutral position, means for reciprocating said plunger so that the enlarged and reduced portions of said plunger cooperate with said cross passageways and said cylinder ports to form two continuous flow paths, one from said supply port to one of said cylinder ports and the other from the second cylinder port to the return port, and means for reversing the flow paths from the supply and return ports to the opposite cylinder ports.

7. A valve for controlling the flow of hydraulic fluid comprising a valve body having a bore therein, a reciprocable valve plunger disposed in said bore, a pressure relief valve mounted in said valve body, said plunger having a plurality of enlarged and reduced portions, said valve body forming a plurality of cross passageways, a plurality of connecting passageways including a by-pass passageway, a supply port, two cylinder ports, and a return port, one of said connecting passageways being controlled by said pressure relief valve, said supply port communicating by means of one of the cross passageways to both the bore and to the connecting passageway controlled by the pressure relief valve, said cross passageways and connecting passageways being in communication with each other so as to form a plurality of continuous paths communicating the bore to the return port, the by-pass passageway communicating the supply port to the return port and by-passing the pressure relief valve when the valve plunger is in the neutral position, a valve member, simultaneously reciprocable in a direction opposite to the direction of movement of the valve plunger, for closing the by-pass passageway upon moving the valve plunger in either direction out of neutral position, means for reciprocating said plunger so that the enlarged and reduced portions of said plunger cooperate with said cross passageways and said cylinder ports to form two continuous flow paths, one from said supply port to one of said cylinder ports and the other from the second cylinder port to the return port, means for reversing the flow paths from the supply and return ports to the opposite cylinder ports, and means including said pressure relief valve for communicating the inlet port to the return port when said plunger is in any position between neutral and operating.

8. A valve for controlling the flow of hydraulic fluid comprising a valve body having a first and second bore therein, a first and a second reciprocable valve plunger respectively disposed in said bores, said plungers each having a plurality of enlarged and reduced portions, said valve body having formed therein a single supply passageway, a plurality of return passageways and a by-pass passageway, a supply port, a return port, and two cylinder ports, said supply passageway joining said bores to each other, said supply port introducing the fluid to said valve body and communicating with said supply passageway, said two cylinder ports, one of which serves as an inlet and the other serves as an outlet and vice versa, communicating with the first bore, said by-pass passageway communicating the supply port to the return port via the second bore when the valve plungers are in the neutral position, means for reciprocating said plungers so that the enlarged and reduced portions of said first plunger cooperate with said supply passageway and return passageways and said cylinder ports to form two continuous flow paths, one path from said supply port to one of said cylinder ports and the other path from the second cylinder port to the return port, means for reversing the flow paths from the supply and return ports to the opposite cylinder ports, and the second valve plunger blocking said by-pass passageway when the first plunger is positioned to form said flow paths.

NICHOLAS FENGER.

REFERENCES CITED

The following references are of record in the file of this patent:

UNITED STATES PATENTS

| Number | Name | Date |
|---|---|---|
| 856,655 | McMillin | Jan. 11, 1907 |
| 954,492 | Zelle | Apr. 29, 1941 |
| 2,240,163 | Pick | Apr. 29, 1941 |
| 2,243,364 | Trautman | May 27, 1941 |
| 2,289,567 | Berglund | July 14, 1942 |
| 2,362,944 | Stephens | Nov. 14, 1944 |
| 2,393,805 | Parker | Jan. 26, 1946 |
| 2,499,425 | Stephens | Mar. 7, 1950 |